bject of this invention to provide
United States Patent Office 3,425,548
Patented Feb. 4, 1969

3,425,548
FLOTATION PROCESS
Douglas H. Fenske and Lynn L. McMurray, Houston, Tex., assignors to Dresser Industries, Inc., Dallas, Tex., a corporation of Delaware
No Drawing. Filed Nov. 19, 1965, Ser. No. 508,841
U.S. Cl. 209—166     4 Claims
Int. Cl. B03d 1/00

ABSTRACT OF THE DISCLOSURE

A glass sand containing kaolin and ferruginous material is pulped with water and a dispersant such as sodium tetrapyrophosphate and deslimed. The deslimed sand is then subjected to flotation treatment in an acid medium with an alkali petroleum sulfonate and an aryl dithiophosphoric acid type promoter to remove both ferruginous material and kaolin in the froth and produce a concentrate reduced in both $Fe_2O_3$ and $Al_2O_3$ content.

---

This invention relates to the separation of a granular mixture of silica or glass sand from ferruginous material and kaolin clay by the selective flotation thereof in a single flotation step.

The major constituent of a mixture commonly used for the manufacture of glass is silica or glass sand. Although glass sand is the most abundant material on the earth's surface, relatively few areas contain this sand in deposits of a purity required for the manufacture of flint glass. Glass sand from all deposits currently in use must be washed and sized to give a specific distribution of grain sizes. A sand from most deposits must also be further beneficiated to remove harmful minor constituents such as ferruginous materials and clay. The ferruginous materials can impart undesirable color to the finished glass which may be controlled or blocked at considerable cost or in some cases cannot be compensated for at any cost. The ferruginous materials and clay cause the formation of seeds and cords in the finished glass which detract from its appearance and creates areas of weakness, thereby rendering it unsuitable for container ware.

The commonly accepted standard for an acceptable flint grade silica sand is one containing less than 0.025% $Fe_2O_3$ and 0.20% $Al_2O_3$ and practically no refractory metals.

Many methods have been devised for the removal of the ferruginous materials and clays by flotation, magnetic separation, electrostatic separation, etc, from sand deposits essentially free from clay. Thus, one method for removing ferruginous materials which are electro-positive, is by froth flotation in the presence of an anionic collector. However, when the original glass sand also contains clay, which is electro-negative, it has been the practice to first remove the ferruginous materials in a flotation step as above indicated and then to remove the clay in a second flotation step which is reverse of the first in that the glass sand is floated from the clay. Since the second flotation step requires the use of cationic reagents, and additional handling of the glass sand, and since it inherently involves product losses, it results in a considerable increase in the processing cost of the glass sand. Accordingly, the two stage flotation process normally cannot compete economically in areas served by glass and sand ores which are free from clay minerals.

It is, therefore, an o a process for removing both ferruginous material and clay from a glass sand in a single stage flotation process.

Another object is to provide a flint quality glass sand containing less than 0.025% $Fe_2O_3$ and less than 0.20% $Al_2O_3$ from ores containing amounts of these two materials in excess of such percentages by a single stage flotation process.

The glass sand feed can be obtained from any suitable ore which contains the glass sand in mixture with kaolin clay. The original ore should have as much of the kaolin clay removed as is possible. For example, the ore can be slurried with water and a dispersant or deflocculating agent such as sodium silicate, sodium tetrapyrophosphate, sodium hexametaphosphate and the like. Thereafter, the sand fraction can be deslimed by various classification techniques well known in the art. The resulting deslimed sand glass fraction will contain ferruginous materials as well as an amount of kaolin clay which is in excess of that desired.

In accordance with the process of this invention, this sand fraction containing these impurities is formed into a pulp or slurry with a pulp density in the range of 60 to 75 weight percent solids, depending upon the particular type of ore being processed. The glass sand slurry then has added to it a collector consisting of an alkali metal petroleum sulfonate having an average molecular weight within the range of 460 to 500. Preferably the molecular weight of this petroleum sulfonate is about 480. It is preferred that sulfonate be previously mixed with mineral oil which acts as a carrier for the sulfonate. The mineral oil can also act as a frothing agent. In a preferred embodiment, the weight ratio of sulfonate to mineral or petroleum oil is about 75 to 25. It has been found that an excellent sulfonate can be prepared by mixing equal portions of petroleum sulfonates sold under the type designations "H–70" and "M–70" by Mineral Oil Refining Company of Dickinson, Tex. These sulfonates have the following properties:

|  | H-70 | M-70 |
|---|---|---|
| Molecular weight | 500 | 460 |
| Percent sulfonate | 70 | 70 |
| Percent oil | 24 | 24 |
| Percent water | 5 | 5 |
| Percent inorganic salt | 0.05 | 0.05 |
| Percent NaOH | 0.1 | 0.1 |
| Percent ASTM color (6% sulfonate) | 5.0 | 4.0 |

The amount of sulfonate to be employed will be dependent upon the specific glass sand being treated and the degree to which it is to be purified. The exact amount to be used in any instance can be readily determined by mere routine tests as is common in the art. Normally an amount within the range of 0.5 to 3 pounds per ton of dry glass sand feed will be sufficient.

In addition to the petroleum sulfonate, an aryl dithiophosphoric acid type promoter can be used to obtain improved results. A preferred promoter type is sold under the name "Aerofloat-31." The amount of promoter can vary and the optimum amount for any given glass sand feed can be determined by mere routine test. Usually an amount within the range of 0.5 to 1.0 pound per ton of glass sand feed will be sufficient.

The flotation reaction takes place in the acid media. To obtain this, a strong inorganic acid, preferably sulfuric acid, can be added to the glass sand slurry in an amount sufficient to lower the pH well into the acid range. The amount of acid, like the other reagents, will depend upon the particular sand being treated but sufficient should be used to lower the pH of the slurry into the range of 2 to 4. Normally less than 2.5 pounds per ton of sulfuric acid will be required and as little as 1.5 pounds per ton may suffice.

After the glass sand slurry has been conditioned as above set out, it can be passed to a standard flotation cell and frothed in a conventional manner. The ferruginous material and clay will concentrate in the froth while the tailings of glass sand will contain reduced amounts of these impurities.

Example

An ore was obtained from Limestone County, Tex. which contained approximately 30% kaolin clay and 70% glass sand. The ore was classified into a sand fraction and a deslimed clay fraction. The deslimed sand fraction was conditioned at 72% solids with one (1) pound per ton of sulfuric acid, 0.66 pound per ton of aryl dithiophosphoric acid type promoter ("Aerofloat-31") and 2 pounds per ton of sodium sulfonate having a molecular weight of 480. This particular sulfonate was the preferred mixture of "H-70" and "M-70" sulfonates described above. The treated sand was then passed into a flotation cell and various analyses were made of the feed, sand concentrate, etc. as illustrated in the following table.

| Test | Sand feed | | Sand concentrate | | | Percent rejection to tails | |
|---|---|---|---|---|---|---|---|
| | Percent $Fe_2O_3$ | Percent $Al_2O_3$ | Percent sand recovered | Percent $Fe_2O_3$ | Percent $Al_2O_3$ | $Fe_2O_3$ | $Al_2O_3$ |
| 1 | .0632 | .38 | 96.5 | .022 | .16 | 66.4 | 58.1 |
| 2 | .0516 | .25 | 98.1 | .021 | .09 | 59.5 | 66.4 |
| 3 | .0357 | .23 | 97.4 | .017 | .16 | 53.5 | 33.9 |

All percentages are expressed as weight percentages.

From the foregoing, it will be seen that this invention is one well adapted to attain all of the ends and objects hereinabove set forth, together with other advantages which are obvious and which are inherent to the process.

It will be understood that certain features and sub-combinations are of utility and may be employed without reference to other features and subcombinations. This is contemplated by and is within the scope of the claims.

The invention having been described, what is claimed is:

1. A process for producing flint quality glass sand from a glass sand feed containing both ferruginous material and kaolin clay which comprises:
   (a) pulping the glass sand feed with water and a dispersant selected from the group consisting of sodium silicate, sodium tetrapyrophosphate and sodium hexametaphosphate;
   (b) desliming the resultant pulp;
   (c) adding to the deslimed glass sand fraction a minor but effective amount of an alkali metal petroleum sulfonate having an average molecular weight within the range of 460 to 500, an effective amount of an aryl dithiophosphoric acid type promoter and sufficient strong inorganic acid to render the pulp acidic;
   (d) agitating the resulting mixture in a single flotation step to produce a froth containing both ferruginous material and kaolin clay;
   (e) removing the froth; and
   (f) recovering flint quality glass sand having reduced quantities of both ferruginous material and kaolin clay.

2. The process of claim 1 wherein said sulfonate has an average molecular weight of about 475.

3. The process of claim 1 wherein said acid is sulfuric acid.

4. A process for producing glass sand containing less than 0.25% by weight of ferruginous material (expressed as $Fe_2O_3$) and less than 0.20% by weight of kaolin clay (expressed as $Al_2O_3$) from a glass sand feed containing more than such weight percentage of ferruginous material and kaolin clay comprising the steps of:
   (a) pulping the glass sand feed with water and a dispersant selected from the group consisting of sodium silicate, sodium tetrapyrophosphate and sodium hexametaphosphate;
   (b) desliming the resultant pulp;
   (c) adding to the deslimed glass sand fraction a minor but effective amount of an alkali metal petroleum sulfonate having an average molecular weight within the range of 460 to 500, an effective amount of an aryl dithiophosphoric acid type promoter and sufficient strong inorganic acid to render the pulp acidic;
   (d) agitating the resulting mixture in a single flotation step to produce a froth containing both ferruginous material and kaolin clay;
   (e) removing the froth; and
   (f) recovering as a concentrate flint quality glass sand containing less than 0.025% by weight of ferruginous material (expressed as $Fe_2O_3$) and less than 0.20% by weight of kaolin clay (expressed as $Al_2O_3$).

References Cited

UNITED STATES PATENTS

| 2,052,227 | 8/1936 | Hood | 209—166 |
| 2,257,808 | 10/1941 | Phelps | 209—166 |
| 2,483,192 | 9/1949 | Gieseke | 209—166 |

FOREIGN PATENTS 463,507  3/1950  Canada.

HARRY B. THORNTON, *Primary Examiner.*

ROBERT HALPER, *Assistant Examiner.*